United States Patent Office

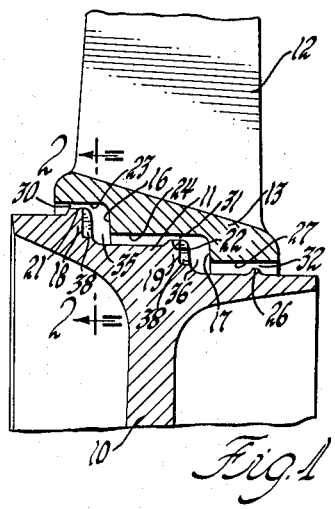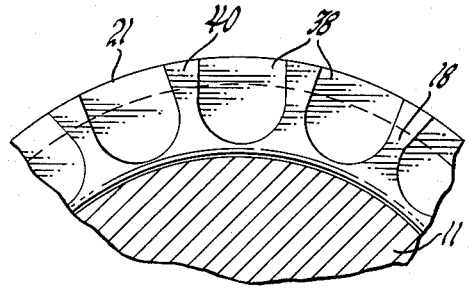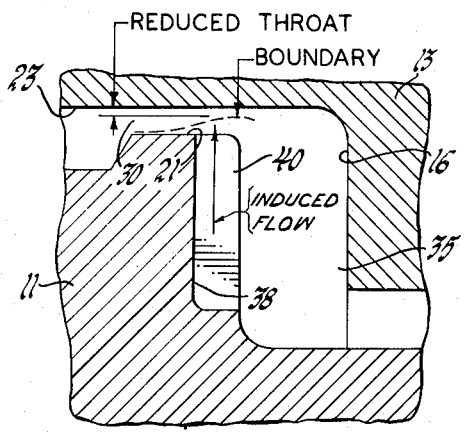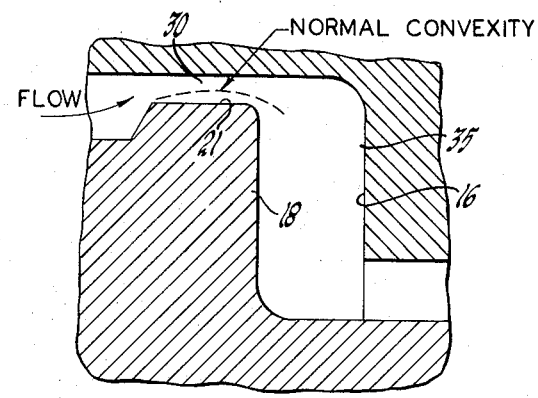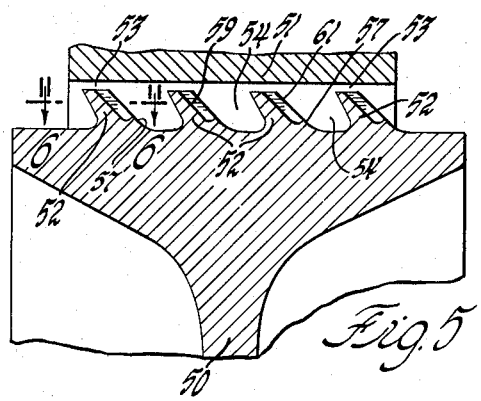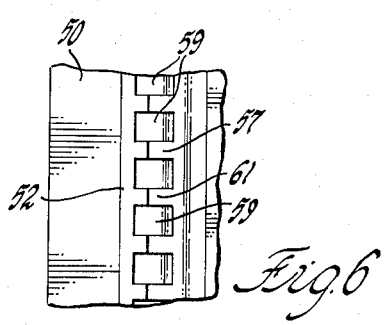

3,251,601
Patented May 17, 1966

---

3,251,601
LABYRINTH SEAL
Robert R. Harvey, Indianapolis, Ind., assignor to General Motors Corporation, Detroit, Mich., a corporation of Delaware
Filed Mar. 20, 1963, Ser. No. 266,652
3 Claims. (Cl. 277—53)

My invention is directed to improvements in labyrinth seals, particularly such as are used between the rotors and stators of turbomachines. Labyrinth seals are used to minimize leakage of gas between relatively rotating parts in cases where direct contact seals are not feasible. They are very frequently used between the tips of the stationary blades and the rotor structure of compressors and turbines and, in some cases, between the tips of the rotating blades and the stator structure of such machines. Their use between shafts and bearing housings for the shaft is also quite common.

As is well known, a labyrinth seal involves one or more, and commonly a considerable number, of annular orifices or throats between the relatively moving parts, with relatively open chambers between the orifices so that the leaking gas is accelerated through the orifices or constricted portions of the seal and decelerated in the chambers. The resulting disturbed and turbulent flow is much less than the flow through a simple annular passage of equally small radial dimension.

The effectiveness of labyrinth seals is very important, particularly with large diameter seals such as those at blade and vane tips of axial-flow compressors and turbines. Leakage of air seriously comprises the efficiency of these machines. To prevent rubbing interference and damage, particularly with rotors of considerable size, it may be necessary to provide a radial clearance in the range from three- to five-thousandths of an inch. The result is that any labyrinth seal provides a series of annular orifices of such considerable radial width and of an area equal to the circumference times the radial clearance.

My invention is directed to reducing the effective clearance and the effective leakage area of a labyrinth seal throat or orifice by the dynamic effect of a stream of air or gas directed radially of the seal and, therefore, transversely to the direction of leakage flow. Significant throttling of the flow path and, therefore, reduction of leakage may be effected without any decrease in the actual physical clearance dictated by mechanical considerations.

The nature of my invention will be apparent to those skilled in the art from the succeeding detailed description of preferred embodiments and the accompanying drawings.

FIGURE 1 is a fragmentary sectional view through a turbine illustrating a first embodiment of the invention, the section being taken in a plane containing the axis of rotation.

FIGURE 2 is a transverse sectional view taken on the plane indicated by line 2—2 of FIGURE 1.

FIGURE 3 is a diagram illustrating the flow through the gap of a labyrinth seal of the prior art.

FIGURE 4 is a diagram illustrating the flow path as reduced by my invention.

FIGURE 5 is a view similar to FIGURE 1 of a second embodiment of the invention.

FIGURE 6 is a fragmentary view taken on the plane indicated by the line 6—6 of FIGURE 5.

We may refer first to FIGURES 1 and 2, wherein an embodiment of the invention is illustrated as a labyrinth seal between stationary blading and the rotor structure of an axial-flow turbine. In these figures, the radially outer portion of a turbine rotor spacer disk or seal disk 10 is shown, this disk having a flange or rim portion 11 extending forwardly and rearwardly of the disk. The radially inner portion of one of a cascade of stator vanes 12 is illustrated, the vane preferably being integral with an inner shroud ring 13. As shown, expansion of the motive fluid is from left to right in FIGURE 1 and, therefore, the higher pressure is to the left in the figure and the lower pressure to the right. It will be understood that the shroud 13 and rim 11 are annular, the shroud in many cases being segmented.

The labyrinth seal of the invention is defined by rim 11 and shroud 13 and is provided to minimize leakage of motive fluid from the high pressure side of the vanes 12 to the low pressure side. As illustrated, the shroud 13 as two radial steps or abutments 16 and 17 on its inner surface, and the rim 11 provides two generally radial shoulders 18 and 19 on its outer surface. These shoulders terminate at their outer edges in surfaces 21 and 22 which are closely adjacent to the radially inner surfaces 23 and 24 of the shroud 13. There is also a ridge 26 from the rim which is closely adjacent the radially inner surface portion 27 of the shroud. It will be seen that these parts define three throats or orifices 30, 31, 32 between the relatively rotating parts. Downstream of the shoulders 18 and 19, the rim and shroud are relatively spaced to define chambers 35 and 36 within which turbulent and inefficient flow results from the discharge through the orifices 30 and 31. Similarly, the orifice 32 discharges into the space downstream of the seal.

The width of the leakage path through the orifices 30 and 31 will ordinarily be made as small as is feasible, the exact dimension varying greatly with the design of the turbomachine. However small it may be made by precise manufacture, there is a limit below which it will be impossible to reduce the clearance because, if it is further reduced, there will be rubbing and the seal will either be badly damaged or will create its own necessary clearance by rubbing.

In accordance with my invention, the faces or shoulders 18 and 19 are modified in any suitable way to provide blades or vanes extending from the shoulder to create what amounts to a centrifugal fan or pump which, during rotation of the disk 10, will circulate the air or other gas within the chamber 35 or 36 radially outwardly. Such a structure may be arrived at by various means such as machining the disk, or by casting or molding parts of the seal in appropriate cases. In this case, as illustrated in FIGURES 1 and 2, the shoulders 18 and 19 are spot-faced to provide closely adjacent shallow recesses 38 between which blades or vanes 40 extend from the shoulder 18.

The action and advantages of this will be clearer from consideration of FIGURES 3 and 4, in which FIGURE 3 illustrates diagrammatically a seal structure such as that of FIGURE 1 without the blades 40 (which may be considered to be prior art), and FIGURE 4 is a view generally corresponding to FIGURE 1 but to a much greater scale. The parts in FIGURES 3 and 4 corresponding to those of FIGURE 1 are correspondingly identified. Note that in FIGURE 3, the flow through the throat may, in effect, separate from the surface 21 because of the contraction at the entrance to the throat, as illustrated by the line identified as "Normal Convexity." Thus, the effective aperture is slightly less than the actual aperture. This common phenomenon is ordinarily recognized by orifice constants.

However, if the face 18 is cut away to provide the radial blades 40, there will be a radial flow of air indicated by the arrow and legend "Induced Flow" due to the centrifugal fan action of blades 40. The result of this discharge is to partially block the orifice 30; in other words, to crowd the leakage flow toward the outer edge of the orifice. This change is indicated by the dotted line identified as "Boundary" and the considerably reduced dimensions of the throat are indicated by the legend "Reduced Throat."

It should be apparent that the principles of this invention are applicable to labyrinth seals of various types and of any number of stages, and that the fan or impeller structure may be created in various ways. FIGURE 5 illustrates a modified labyrinth seal in which a rotor 50 rotates within an annular body or stator 51. Four ribs 52 on the rotor are inclined toward the high pressure side, at the left as shown in FIGURE 5. This structure provides four orifices or throats 53 and three intermediate chambers 54. The faces 57 of the ribs are milled or slotted to provide radial grooves 59 between which there remain vanes 61 which act as fan impellers. The action in this form is the same as that previously described.

The labyrinth seal rib may be of any siutable form and the blades may be provided by any suitable treatment. The dimensions or scale of the parts will, of course, be such as is appropriate to the installation, there being nothing critical about the dimensions so far as I am aware.

It may be pointed out that the principles of my invention are quite different from those of seals in which a static head is developed in a liquid such as water, oil, or mercury by centrifugal pumping action to oppose or block the gas pressure tending to cause flow around a shaft or the like.

The detailed description of preferred embodiments of the invention are not to be considered as limiting the invention, since many modifications may be made by exercise of skill in the art within the scope of the invention.

I claim:

1. A labyrinth seal structure comprising, in combination, a stator member, a rotor member disposed adjacent the stator member and mounted for rapid rotation, the said members being mutually spaced to provide running clearance for relative rotation, the members defining between them a passage from a first space containing a gaseous fluid under a first pressure to a second space containing a fluid under a second and lower pressure, the passage being configured to provide in succession from the first to the second space an annular orifice having small clearance between the rotor and stator and an annular chamber having clearance between the rotor and stator large relative to that of the orifice, the chamber being demarked from the orifice by a shoulder on the rotor transverse to the direction of flow through the orifice, the rotor having vanes extending from the said shoulder into the chamber adapted to pump the said gaseous fluid in the chamber across the exit of the said orifice transversely to the direction of flow through the orifice and thus provide a dynamic restriction of the said orifice below the geometric clearance therein between the members.

2. A labyrinth seal structure as recited in claim 1 in which the fluid contained in the said annular chamber is gaseous.

3. A labyrinth seal structure comprising, in combination, an annular outer member, an annular inner member disposed within the outer member and mounted for rapid rotation, the said members being mutually radially spaced to provide running clearance for relative rotation, the members defining between them a passage from a first space containing a gaseous fluid under a first pressure to a second space containing a gaseous fluid under a second and lower pressure, the passage being configured to provide in succession from the first to the second space a plurality of annular throats having small clearance between the members and an annular chamber having clearance between the rotor and stator large relative to that of the throats between each succeeding pair of throats, each chamber being demarked from the throat upstream thereof by a generally radial face on the inner member, the said face having vanes extending therefrom into the chamber adapted to pump the said gaseous fluid in the chamber radially across the exit of the said throat transversely to the direction of flow through the throat and thus provide a dynamic restriction of the said throat below the geometric clearance dimension thereof enforced by mechnical tolerances.

References Cited by the Examiner

UNITED STATES PATENTS 1,463,018    7/1923    Junggren _____ 277—53 X

FOREIGN PATENTS 274,049    5/1928    Great Britain.
660,396    11/1951    Great Britain.

SAMUEL ROTHBERG, *Primary Examiner.*

SAMUEL B. ROTHBERG, *Examiner.*